United States Patent
Zanzig et al.

(10) Patent No.: US 6,761,198 B2
(45) Date of Patent: Jul. 13, 2004

(54) PNEUMATIC TIRE HAVING LUG AND GROOVE CONFIGURATION EXTENDING FROM TREAD OVER AT LEAST 30% OF SIDEWALL

(75) Inventors: David John Zanzig, Uniontown, OH (US); Bernard Matthew Bezilla, Jr., Stow, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 108 days.

(21) Appl. No.: 09/780,548

(22) Filed: Feb. 9, 2001

(65) Prior Publication Data

US 2001/0020505 A1 Sep. 13, 2001

Related U.S. Application Data

(63) Continuation-in-part of application No. 09/260,815, filed on Mar. 2, 1999, now abandoned.

(51) Int. Cl.$^7$ ............................. B60C 1/00; B60C 11/00; B60C 11/11; B60C 13/02
(52) U.S. Cl. ............................. 152/209.5; 152/209.16; 152/523; 152/525; 152/902
(58) Field of Search ........................... 152/209.1, 209.5, 152/209.12, 209.16, 523, 525, 902, 905; 524/492, 493, 495, 496

(56) References Cited

U.S. PATENT DOCUMENTS

| 917,612 A | 4/1909 | Kempshall | 152/523 |
|---|---|---|---|
| 2,592,557 A | 4/1952 | Gibbs | 152/209 |
| 4,152,186 A | * 5/1979 | Shibata | |
| 4,703,079 A | * 10/1987 | Ahmad et al. | |
| 5,188,683 A | 2/1993 | Bonko | 152/209 |
| 5,284,898 A | * 2/1994 | Thise | |
| 5,739,198 A | 4/1998 | Sandstrom et al. | 524/493 |
| 5,753,761 A | * 5/1998 | Sandstrom et al. | |
| 5,929,157 A | * 7/1999 | Matsuo | |
| 6,044,882 A | 4/2000 | Crawford et al. | 152/152 |
| 6,046,266 A | 4/2000 | Sandstrom et al. | 524/492 |

FOREIGN PATENT DOCUMENTS

| AU | 37769 | * 7/1978 | |
|---|---|---|---|
| CH | 224331 | 11/1942 | 152/902 |
| DE | 2744848 | 4/1978 | 152/209 |
| EP | 0508813 | 10/1992 | B60C/11/00 |
| EP | 0989161 | 3/2000 | C08L/9/00 |
| JP | 3-31008 | * 2/1991 | |
| WO | 9952720 | 10/1999 | B60C/11/11 |

OTHER PUBLICATIONS

Donnet et al, *Carbon Black*, pp. 19–21, 1976.*
European Search Report.

* cited by examiner

*Primary Examiner*—Steven D. Maki
(74) *Attorney, Agent, or Firm*—Henry C. Young, Jr.

(57) ABSTRACT

This invention relates to a pneumatic rubber tire having a rubber sidewall composition of a lug and groove configuration which is designed to be ground contacting. Such sidewall configuration is of a rubber composition comprised of a blend of natural rubber and cis 1,4-polybutadiene rubber which contains specified carbon black reinforcement and silica together with a coupling agent. The tire tread rubber composition differs from the rubber composition of said sidewall lug and groove configuration by being exclusive of silica and coupling agent and carbon black reinforcement exclusive of said specified carbon black.

16 Claims, 2 Drawing Sheets

Figure 1:
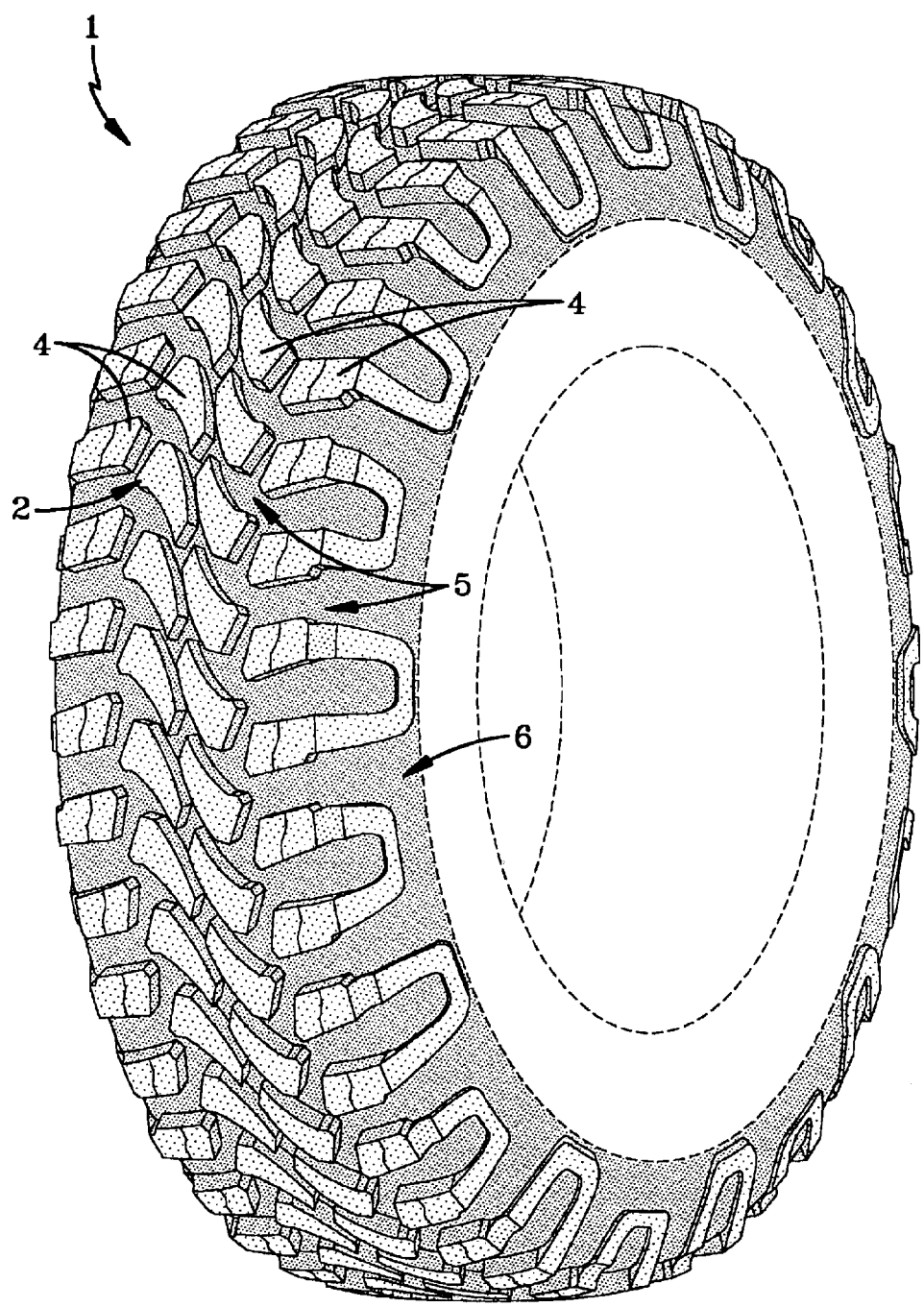

PNEUMATIC TIRE HAVING LUG AND GROOVE CONFIGURATION EXTENDING FROM TREAD OVER AT LEAST 30% OF SIDEWALL

This is a Continuation-in-Part of application Ser. No. 09/260,815, filed on Mar. 2, 1999, now abandoned.

FIELD OF THE INVENTION

This invention relates to a pneumatic rubber tire having a rubber sidewall of a lug and groove configuration which is designed to be ground contacting. Such sidewall configuration is of a rubber composition comprised of a blend of natural rubber and cis 1,4-polybutadiene rubber which contains specified carbon black reinforcement and silica together with a coupling agent. The tire tread rubber composition differs from the rubber composition of said sidewall lug and groove configuration by being exclusive of silica and coupling agent and carbon black reinforcement exclusive of said specified carbon black.

BACKGROUND OF THE INVENTION

Pneumatic rubber tires are conventionally composed of a toroidal carcass with a circumferential tread and adjoining sidewalls.

The tread is conventionally designed to be ground-contacting and thereby is of a suitable rubber composition for such purpose and also is of a suitable configuration. For example, such a tread may have properties which emphasize good traction and resistance to treadwear. Such tires may have a tread of a lug and grove configuration which is designed to be ground-contacting.

In contrast, the associated sidewalls are conventionally not designed to be ground contacting and, in order to be appropriately supportive of the tread, are conventionally composed of a rubber composition which is not designed for traction and resistance to treadwear but, instead, of a rubber composition which is of low hysteresis to provide low heat buildup and is softer to provide greater flexibility than that of the tread rubber.

As a result, such softer sidewall rubber compositions typically have less resistance to puncturing objects, abrasion and to scuffing against road curbs or other objects.

However, some tires are desired to be utilized under more harsh conditions such as, for example, rough roads or off-the-road service or on specialty vehicles which may be designed to run on low inflation tires where the tire sidewall may come in contact with the ground. Such circumstances may occur, for example, in various mine operations and in logging operations, or where the tire is run over rough terrain at low inflation pressures. Under such conditions, growth of a crack, or cut, in the sidewall and, also, resistance to puncture, are significant considerations.

A significant need for a sidewall rubber composition for such use is a hybrid rubber composition which with suitable resistance to puncture and abrasion typically associated with tread rubber compositions while substantially maintaining flex fatigue and hysteretic properties typically associated with sidewall rubber compositions.

It is appreciated that commercially available tires may sometimes have sidewalls designed to be resistant to cut growth which are comprised of carbon black reinforced elastomer compositions comprised of natural rubber and cis 1,4-polybutadiene rubber.

It is also appreciated that carbon blacks for reinforcement of tire sidewall rubber compositions are conventionally of appreciably larger particle size than carbon blacks usually used for tire treads since resistance to heat buildup rather than abrasion resistance is typically more important for tire sidewalls.

Such carbon black might be exemplified, for example, by having an Iodine value (number) (ASTM D1510) in a range of about 35 to about 85 g/kg instead of a higher iodine value of at least about 105 which would be more representative of a carbon black typically used for a tread rubber composition.

Here, however, it is desired to provide a novel tire with rubber sidewall of a composition comprised of natural rubber and cis 1,4-polybutadiene of which a significant portion is designed to be occasionally ground-contacting and thereby having a resistance to puncture as well as resistance to abrasion more typical of tire tread rubber compositions yet substantially retaining flexibility and low hysteresis usually required for a tire sidewall.

It may be readily thought of to increase the natural rubber content of the sidewall composition in order to increase resistance to tear. However the cis 1,4-polybutadiene content would be correspondingly reduced which would be expected to thereby undesirably reduce its resistance to abrasion and undesirably increase its hysteresis (as would be expected to be evidenced by a reduction in its rebound property).

Accordingly, it is desired herein to provide such a tire sidewall of a rubber composition which contains large particle size carbon black reinforcement common for sidewall compositions and which is composed of natural rubber and cis 1,4-polybutadiene elastomers, also somewhat common to many sidewall compositions but, however, which has enhanced resistance to abrasion and puncturing objects and, also enhanced resistance to tear more common to tire tread rubber compositions.

In the description of this invention, the term "phr" relates to parts by weight of an ingredient per 100 parts by weight of rubber.

The terms "rubber" and "elastomer are used interchangeably.

The term "Tg" relates to a glass transition temperature of an elastomer, normally determined by a differential scanning (DSC) calorimeter with a temperature rise of 10° C. per minute.

Disclosure and Practice of the Invention

In accordance with this invention, a pneumatic rubber tire is provided with a carcass with circumferential rubber tread and associated sidewalls, wherein said tread and a portion of said sidewalls are of a lug and groove configuration designed to be ground-contacting, wherein said lug and groove configuration extends from said tread over at least thirty, alternatively at least fifty, percent of the tire sidewall adjacent to said tread, and alternately at least to a maximum section width of the tire, and wherein (A) the said lug and groove configured portion of said sidewall is of a rubber composition which comprises, based on 100 parts by weight rubber (phr),
  (1) elastomers comprised of
    (a) about 40 to about 80, preferably about 45 to about 70, phr of cis 1,4-polyisoprene natural rubber and
    (b) about 20 to about 60, preferably about 30 to about 55, phr of cis 1,4-polybutadiene rubber,
  (2) about 55 to about 80 phr of reinforcing filler comprised of carbon black and precipitated silica which is comprised of
    (a) about 5 to about 40 phr of carbon black having an Iodine value (ASTM D1510) of about 35 to about 85 g/kg and a dibutylphthalate (DBP) value (ASTM D2414) of about 70 to about 130 cm3/100 g and (b) about 10 to about 70 phr of precipitated silica having a BET surface area of about 125 to about 200 m2/g; wherein the weight ratio of silica to carbon black is in a range of about 0.3/1 to about 3/1, preferably about 0.8/1 to about 1.5/1, and wherein said rubber composition is exclusive of carbon blacks having an Iodine value of greater than 85 g/kg, and (3) a coupling agent having a moiety reactive with silanol groups on said silica and another moiety interactive with said elastomers, and (B) wherein the rubber composition of said circumferential tread, other than said rubber composition of said lug and groove configuration of said tire sidewall, is comprised of, based on 100 parts by weight rubber (phr):

(1) at least one diene based elastomer selected from polymers of isoprene and 1,3-butadiene and their mixtures and copolymers of isoprene, 1,3-butadiene and their mixtures with styrene, (2) about 30 to about 95, alternately about 40 to about 75, phr of carbon black having Iodine value in a range of about 100 to about 145 g/kg and a DBP value in a range of about 110 to about 145 cm3/100 g;

wherein said tread rubber composition is exclusive of silica and coupling agent, and wherein said tread rubber composition is exclusive of carbon black reinforcement having an Iodine value of about 35 to about 85 g/kg and a dibutylphthalate (DBP) value of about 70 to about 130 cm3/100 g.

Therefore, the circumferential tire tread rubber composition differs significantly from the rubber composition of the lug and groove portion of the tire sidewall.

While the required different rubber compositions for the said circumferential tire tread and for said lug and groove portion of the tire sidewall is a significant aspect of this invention, the remainder of this specification is primarily presented in the context of, and is therefore primarily directed to, the rubber composition of the said lug and groove portion of the tire sidewall, unless otherwise specified.

In particular, use of natural rubber, silica and coupling agent of the sidewall rubber composition is designed to enhance resistance to tear, puncturing and abrasion while substantially maintaining hysteresis, or rebound physical property, of the sidewall rubber composition.

In particular, use of cis 1,4-polybutadiene rubber in the sidewall rubber composition is designed to enhance resistance to abrasion and promoting or maintaining a relatively low hysteresis (relatively high rebound property).

In one aspect of the invention, a relative immiscibility of the cis 1,4-polybutadiene rubber phase in the natural rubber phase is relied upon to contribute a resistance to cut/crack growth propagation for the sidewall composition. The relative immiscibility is primarily a result of a wide disparity of the glass transition temperatures (Tg's), namely differing by at least 30° C., of the cis 1,4-polybutadiene rubber (e.g.: about –100° C. to about –106° C.) and the natural rubber (e.g.: about –65° C. to about –70° C.). Such immiscibility phenomenon due to disparity of Tg's of various elastomers is well known to those skilled in such art.

In order to enhance such disparity of Tg's for the elastomers of the sidewall rubber composition, it is preferred that the sidewall rubber composition is exclusive of elastomer(s) with Tg's intermediate (between) the aforesaid Tg's of said natural rubber and cis 1,4-polybutadiene rubber, namely elastomers having a Tg in a range of about –70° C. and about –100° C.

Accordingly, in order to provide such a sidewall rubber composition for the sidewall lug and groove configuration designed to be ground contacting which is therefore both resistant to tear and to crack propagation and also resistant to abrasion, the blend of natural rubber and cis 1,4-polybutadiene rubber blend, with their aforesaid spaced apart Tg's is reinforced with a combination of relatively large size carbon black and particulate silica together with a coupling agent.

In particular, the larger size carbon black is a carbon black conventionally used for rubber sidewalls and is in contrast to relatively small size carbon blacks conventionally used for tire tread rubber compositions. It is considered herein that a contribution of such relatively large size carbon black is to promote cut growth resistance to the sidewall rubber composition.

In particular, a precipitated silica is required by this invention to be used in combination with the larger size carbon black as reinforcement for the natural rubber/cis 1,4-polybutadiene sidewall rubber composition. It is considered herein that a significant contribution of the silica, when used with a coupling agent, is to enhance modulus (e.g.: 300% modulus), puncture resistance, abrasion resistance, tear resistance while substantially maintaining a relatively low hysteresis for the rubber composition.

Therefore, a significant aspect for the rubber sidewall of this invention configured with a lug and groove design for ground contacting purposes is the unique combination of specified amounts of natural rubber and cis 1,4-polybutadiene rubber with spatially defined Tg's and with a specified reinforcement system of selected relatively large particle size carbon black and silica with coupling agent to achieve such rubber composition with acceptable resistance to abrasion and resistance to puncture while substantially maintaining low hysteresis (rebound physical property) and flex properties.

The natural rubber for use in this invention is a cis 1,4-polyisoprene rubber typically having a cis 1,4-content in a range of about 95 to about 100 percent and a Tg in a range of about –65° C. to about –70° C.

The cis 1,4-polybutadiene for use in this invention preferably has a cis 1,4-content in a range of about 95 to about 99 percent and a Tg in a range of about –100° C. to about –106° C.

It is of a particular importance for this invention that the cis 1,4-polysioprene rubber and cis 1,4-polybutadiene rubber for use in this invention have spaced apart Tg's, namely Tg's that differ by at least 30° C. in order that the rubbers are relatively incompatible, or immiscible, with each other in order, for example, to promote resistance to cut growth.

The relatively large size carbon black for use in this invention is evidenced by having an Iodine number in a range of about 35 to about 85 g/kg and a DBP value in range of about 70 to about 130 cm3/100 g.

Representative examples of such large carbon blacks are, for example, of ASTM designations: N550, N660 and N326 rather than smaller particle sized N110, N121 and N299 carbon blacks more normally used for tread rubber compositions.

Accordingly, it is desired for the carbon black reinforcement filler in the lug and groove portion of sidewall to be exclusive of carbon blacks having an Iodine number (value) of 85 g/kg or greater.

However, for the tire of this invention, where its circumferential tread is normally intended to be suitable for ground contacting on a relatively smooth road surface, although is not limited to use on such surface, its circumferential tread rubber composition is required to be exclusive of such carbon black and, instead, contain significantly smaller particle size carbon black having an Iodine number of 100 g/kg or greater and exclusive of carbon blacks having an Iodine value of less than 85 g/kg. Representative examples of such carbon blacks for said circumferential tread rubber composition are, for example, those of ASTM designations N110, N121, N134, N205, N234 and N299.

The silica for use in the lug and groove sidewall portion of the tire of this invention is preferably a precipitated silica which may be prepared by acidic precipitation of a silicate, or co-precipitation of a silicate and aluminate and, in general, are well known to those having skill in such art. Typically, such silicas have a BET surface area in a range of from about 125 to about 200 m2/g.

Representative examples of such silicas are, for example Hi-Sil 210, Hi-Sil 243 by PPG Industries, Zeosil 1165 MP and Zeosil 165GR by Rhodia Inc., VN3 by Degussa and Zeopol 8745 by Huber.

For the purposes of this description, the "compounded" rubber compositions refer to the respective rubber compositions which have been compounded with appropriate compounding ingredients such as, for example, carbon black, oil, stearic acid, zinc oxide, silica, wax, antidegradants, resin(s), sulfur and accelerator(s).

For the practice of this invention, relatively large concentrations (e.g.: about 3 to about 6 phr) of antidegradants are used in the sidewall rubber composition in order to promote ozone and oxidation protection.

In the practice of this invention, while the sidewall rubber composition is designed to be comprised of a combination of natural rubber and cis 1,4-polybutadiene rubber, up to about 15 phr of additional elastomers may be included in the composition, namely elastomers selected from isoprene/butadiene copolymer rubbers, synthetic cis 1,4-polyisoprene rubber and emulsion polymerization prepared styrene/butadiene copolymer rubber) E-SBR) although it is preferably comprised essentially of the aforesaid natural rubber and cis 1,4-polybutadiene rubber.

The circumferential tread rubber composition may be comprised of, for example, cis 1,4-polyisoprene, cis 1,4-polybutadiene, styrene/butadiene copolymers, isoprene/butadiene copolymers, high vinyl polybutadiene rubbers having a vinyl content in a range of from about 25 to about 90 percent, styrene/isoprene/butadiene terpolymers, 3,4-polyisoprene, styrene/isoprene copolymers and mixtures of two or more of such elastomers.

In general, and in one aspect, it is desired that the sidewall rubber composition, in order to have sufficient flexibility, is exclusive of trans 1,4-polybutadiene, 3,4-polyisoprene, and high vinyl polybutadiene elastomers (polybutadiene rubber with greater than 50 percent vinyl content).

In the practice of this invention, various coupling agents may be used representative of which, for example are bis-(3-trialkoxysilylalkyl) polysulfides which contain from 2 to 8 sulfur atoms in its polysulfidic bridge, with an average of about 3.5 to about 4.5 sulfur atoms for a polysulfide material and an average of about 2 to about 2.6 for a disulfide material. Such alkyl groups for the alkoxy groups are preferably selected from methyl and ethyl, preferably ethyl, groups and the alkyl group for said silylalkyl moiety is selected from ethyl, propyl and butyl radicals.

Preferably, such coupling agent is a bis(3-triethoxysilylpropyl) polysulfide having an average of from 2 to 2.6 connecting sulfur atoms in its polysulfidic bridge.

It is readily understood by those having skill in the art that the rubber compositions of the sidewall would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 10 phr, if used. Such processing aids can include, for example, aromatic, naphthenic, and/or paraffinic processing oils. Representative silicas may be, for example, hydrated amorphous silicas. Typical amounts of antioxidants comprise about 1 to about 3 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants for the sidewall composition may comprise about 3 to about 6 phr. Representative antiozonants may be, for example, N-(1,3 dimethylbutyl)-N'-phenyl-p-phenylenediamine (6PPD). Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The presence and relative amounts of the above additives are considered to be not an aspect of the present invention which is more primarily directed to the utilization of specified blend of natural rubber and cis 1,4-polybutadiene rubber in tire sidewalls with outer surface of lug and groove configuration designed to be ground-contacting as a sulfur vulcanizable composition which reinforced with a specified combination of relatively large particle sized carbon black together with precipitated silica and coupling agent.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators, including primary and optionally secondary accelerators, are used to control the time and/or temperature required for vulcanization and to improve the properties of the vulcanizate. Often accelerators are used in an amount ranging from about 0.5 to about 2.0 phr. Such accelerators may be, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not necessarily considered to be an aspect of this invention.

Sometimes a combination of antioxidants, antiozonants and waxes may be collectively referred to as "antidegradants".

The tire can be built, shaped, molded and cured by various methods which will be readily apparent to those having skill in such art.

The prepared tire of this invention is conventionally shaped and cured by methods known to those having skill in such art.

Figure 2:
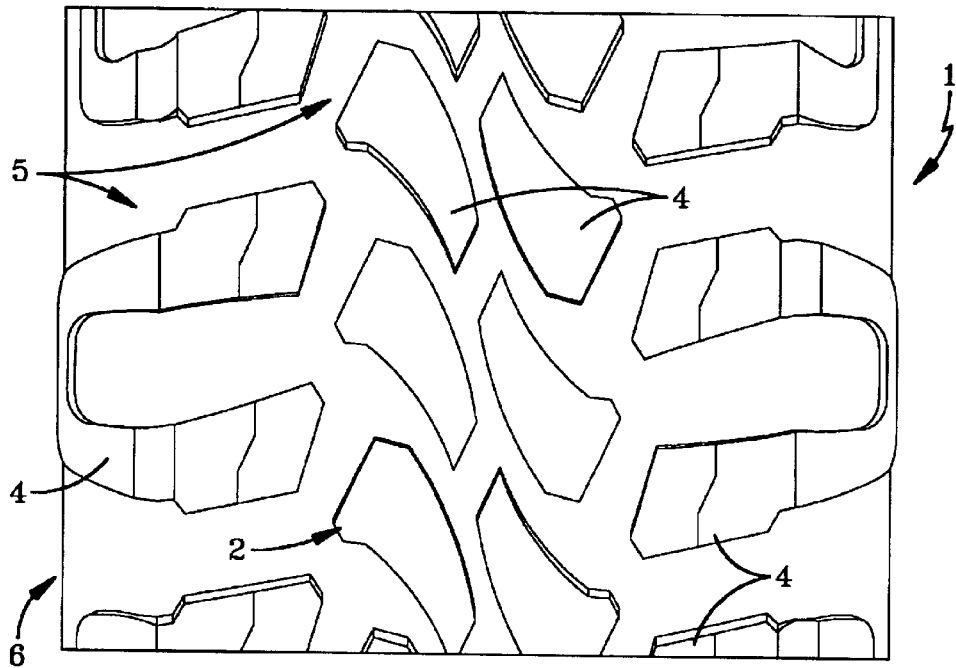
Figure 3:
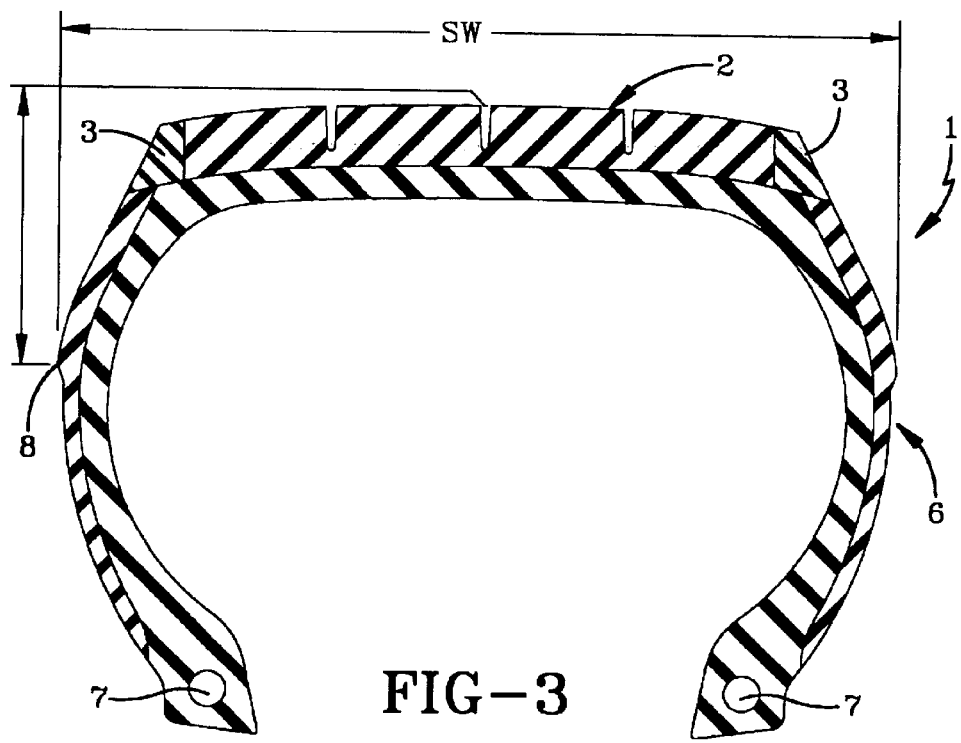

For a further understanding of this invention, reference is made to the accompanying drawings in which FIG. 1 is a perspective view of a tire, FIG. 2 depicts a sectional view of a tire tread and a portion of its sidewalls and FIG. 3 is a tire cross-section.

In particular, in the drawings is seen a tire 1 having a carcass with circumferential rubber tread 2, with tread miniwings 3, having a lug 4 and groove 5 configuration and connecting sidewalls 6.

Uniquely, a portion of the tread 2 with its lug 4 and groove 5 configuration extends to a maximum section width (SW) at position 8 on the sidewall 6 portion adjacent to the tread 2 which is greater than 30 percent, and approximates about 50 percent, of the sidewall 6 surface. This portion of the tread of a lug and groove configuration which extends over and is a part of the tire sidewall of a rubber composition comprised of the aforesaid cis 1,4-polyisoprene and cis 1,4-polybutadiene elastomers together with silica and silica coupler as well as a carbon black with an Iodine value of about 45 g/kg and DBP value of about 120 cm3/100 g.

In contrast, the rubber composition of the centrifugal tread, other than said rubber composition of the lug and groove sidewall is exclusive of silica and silica coupler and uses a carbon black having an Iodine value of about 120 g/kg and a DBP of about 115 cm3/100 g.

In particular, the configured outer surface of the sidewall 6 itself, including the lug 4 and groove 5 configuration thereon and extending to about the bead 7 region of the tire, is of a rubber composition of this invention, namely of the natural rubber and cis 1,4-polybutadiene rubber with Tg's spaced apart by at least 30° C. together with the reinforcement of large particle sized carbon black and silica plus coupling agent.

The invention may be better understood by reference to the following example in which the parts and percentages are by weight unless otherwise indicated.

EXAMPLE I

Mixtures of natural rubber and cis 1,4-polybutadiene rubber are prepared with carbon black particulate reinforcement and are identified herein as Samples A, B and C, with Sample A being a carbon black reinforced Control and with Samples B and C containing silica reinforcement together with a coupling agent.

Ingredients for the elastomer compositions are shown in the following Table 1.

TABLE 1

| Materials | Parts | | |
|---|---|---|---|
| | Control Sample A | Sample B | Sample C |
| Non-Productive Mix Stage | | | |
| Natural rubber[1] | 35 | 50 | 50 |
| Cis 1,4-polybutadiene[2] | 65 | 50 | 50 |
| Carbon black[3] (large particle size) | 51 | 30 | 30 |

TABLE 1-continued

| Materials | Parts | | |
|---|---|---|---|
| | Control Sample A | Sample B | Sample C |
| Silica A[4] | 0 | 30 | 0 |
| Silica B[5] | 0 | 0 | 30 |
| Coupling agent composite | 0 | 5 | 5 |
| Processing oil (paraffinic) | 11 | 0 | 0 |
| Antiozonant[7] | 4 | 4 | 4 |
| Antioxidant[8] | 0 | 2 | 2 |
| Productive Mix Stage | | | |
| Sulfur | 2 | 1 | 1 |
| Accelerators[9] | 0.6 | 1 | 1 |
| Antioxidant[10] | 1.25 | 0 | 0 |

Conventional amounts of antidegradants, as well as fatty acid (stearic acid) zinc oxide, sulfur and accelerators were used.
[1]Natural cis 1,4-polyisoprene rubber having a Tg of about −65° C. to −70° C.
[2]Cis 1,4-polybutadiene as BUDENE ® 1207 from The Goodyear Tire & Rubber Company having a cis 1,4-content of about 99 and a Tg of about −103° C.
[3]N550 having an Iodine value of about 43 g/kg and a DBP value of about 121 cm3/100 g
[4]Hi-Sil 243 silica from PPG Industries having a BET (nitrogen) surface area of about 150 m2/g
[5]Zeopol 8745 silica from Huber having a BET (nitrogen) surface area of about 180 m2/g.
[6]Composite of as X505 from Degussa AG as a combination of bis(3-triethoxysilylpropyl) tetrasulfide coupling agent and carbon in a 50/50 ratio
[7]ntiozonant of the p- phenylenediamine type
[8]Antioxidant as a polymerized trimethyl dihydroquinoline type
[9]Of the sulfenamide and guanidine type.
[10]Mixed diaryl phenylenediamine type

EXAMPLE II

The prepared rubber compositions were cured at a temperature of about 150° C. for about 36 minutes and the resulting cured rubber samples evaluated for their physical properties as shown in the following Table 2. The Samples A, B and C correspond to Samples A, B and C of Example I.

TABLE 2

| Properties | Parts | | |
|---|---|---|---|
| | Control Sample A | Sample B | Sample C |
| Rheometer (150° C.)[1] | | | |
| Minimum torque (dNm) | 6 | 8.9 | 9.5 |
| Maximum torque (dNm) | 24 | 31.8 | 32.5 |
| Stress-strain Properties | | | |
| 300% modulus (MPa) | 4.6 | 7.6 | 8 |
| Tensile strength (MPa) | 13.7 | 17.4 | 18 |
| Elongation at break (%) | 714 | 641 | 645 |
| Tear (force in Newtons)[2] | | | |
| Strebler at 95° C. | 179 | 262 | 232 |
| Fatigue-to-failure[3] cycles (cam #18) | 1412 | 1386 | 1440 |
| DIN abrasion (10 Newtons) cm3 lost | 95 | 69 | 58 |
| Rebound (100° C.) | 57.8 | 58.9 | 60 |
| Hardness, Shore A, 100° C. | 42.6 | 52.4 | 52.6 |

TABLE 2-continued

|  | Parts | | |
| --- | --- | --- | --- |
| Properties | Control Sample A | Sample B | Sample C |
| Blade penetration (mm)[4] | 1.6 | 1.3 | 1.3 |
| Energy penetration (joules)[5] | 1.8 | 2.9 | 3.2 |

[1]Torque applied by an oscillating disk to uncured rubber samples which cures during the test.
[2]Force required to pull apart 5 mm wide strips (180° pull) a measure of adherence to itself.
[3]Dynamic test performed on dumbbell cured rubber samples by continuous flexing at about one Hertz.
[4]The Blade Penetration test (about 25° C.) can generally be described as a 5.3 gm blade attached to a 105.4 cm pendulum released from 15° from vertical and the depth of penetration is measured. A lower value is better (Samples B and C) and is indicative of better resistance to puncturing objects which is a desirable property for the tire sidewall of a lug and groove configuration of this invention.
[5]The Energy Penetration test (about 25° C.) can generally be described as a 45° angle, 4.76 mm diameter, 18 gm indentor driven into a rubber sample block at constant speed of about 100 mm/min. Energy to penetrate to a given depth is recorded. A higher value is better (Samples B and C) and is indicative of better resistance to puncturing objects which is a desirable property for the tire sidewall with the lug and groove configuration of this invention.

As it can readily be seen from Table 2, the 300 percent modulus, tensile, tear, hardness, abrasion and penetration resistance properties of Samples B and C are significantly higher than those of Control Sample A and are seen as being indicative as promoting better resistance to penetration, tear, abrasion and puncturing objects which are desirable properties for the tire sidewall of a lug and groove configuration of this invention which is designed to be ground-contacting.

As it can further be seen from Table 2, the tensile strength and resistance to tear properties of Samples B and C are significantly higher than those of Control Sample A and are seen as promoting greater strength, resistance to puncturing objects and better resistance to tearing which are desirable properties for the tire sidewall of a lug and groove configuration of this invention.

As it also can be seen from Table 2, the DIN abrasion resistance property of Samples B and C is significantly improved (less rubber loss) over that of Control Sample A which is a desirable feature for the tire sidewall with lug and groove configuration of this invention designed to be ground contacting which indicates a greater resistance to scuffing and abrading away in off-road applications.

Another significant aspect observed from the properties reported in Table 2 is that hysteresis, as indicated by the 100° C. rebound values, was unexpectedly substantially maintained at high temperatures (100° C.). This is also a desirable feature for the tire sidewall with lug and groove configuration of this invention where relatively low heat buildup under operating conditions as well as promoting good economy for vehicular operation are important.

Furthermore, as shown in Table 2, it was unexpectedly found that the flex properties were maintained with rubber compositions of substantially higher 300 percent modulus and tensile strength. It is considered herein that one having skill in the rubber compounding art would normally expect that the flex property would have been negatively affected.

Although the mechanism may not be completely understood, it is believed that the improved cut growth resistance for Samples B and C is due to a network formed via the combination of silane coupling agent, silica, carbon black and unique polymer blend.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a carcass with circumferential rubber tread and associated sidewalls, wherein said tread and a portion of said sidewalls are of a lug and groove configuration designed to be ground-contacting, wherein said lug and groove configuration extends from said tread over at least thirty percent of the tire sidewall adjacent to said tread and wherein (A) the said lug and groove configuration of said sidewall is of a rubber composition which comprises, based on 100 parts by weight rubber (phr),
  (1) elastomers exclusive of trans 1,4-polybutadiene, 3,4-polyisoprene and high vinyl polybutadiene elastomer having a vinyl content of greater than fifty percent and comprised of
    (a) about 40 to about 80 phr of cis 1,4-polyisoprene natural rubber and
    (b) about 20 to about 60 phr of cis 1,4-polybutadiene rubber,
  (2) about 55 to about 80 phr of reinforcing filler comprised of carbon black and precipitated silica which is comprised of
    (a) about 5 to about 40 phr of carbon black having an Iodine value (ASTM D1510) of about 35 to about 85 g/kg and a dibutylphthalate (DBP) value (ASTM D2414) of about 70 to about 130 cm$^3$/100 g and
    (b) about 10 to about 70 phr of precipitated silica having a BET surface area of about 125 to about 200 m$^2$/g; wherein the weight ratio of silica to carbon black is in a range of about 0.3/1 to about 3/1 and wherein said rubber composition is exclusive of carbon blacks having an Iodine value greater than 85 g/kg, and
  (3) a coupling agent having a moiety reactive with silanol groups on said silica and another moiety interactive with said elastomers, and
(B) wherein a rubber composition of said circumferential rubber tread, other than said rubber composition of said lug and groove configuration of said tire sidewall, is comprised of, based on 100 parts by weight rubber (phr):
  (1) at least one diene based elastomer selected from polymers of at least one of isoprene and 1,3-butadiene and copolymers of styrene with at least one of isoprene and 1,3-butadiene, and their mixtures,
  (2) about 30 to about 95, alternately about 40 to about 75, phr of carbon black having Iodine value in a range of about 100 to about 145 g/kg and a DBP value of about 110 to about 145 cm$^3$/100 g;
wherein said tread rubber composition is exclusive of silica and coupling agent, and
wherein said tread rubber composition is exclusive of carbon black reinforcement having an Iodine value of about 35 to about 85 g/kg and a dibutylphthalate (DBP) value of about 70 to about 130 cm$^3$/100 g.

2. The tire of claim 1 wherein said lug and groove configuration extends from said tread over at least fifty percent of the tire sidewall adjacent to said tread.

3. The tire of claim 1 wherein said lug and groove configuration extends from said tread over the tire sidewall adjacent to said tread to at least the maximum section width of the tire.

4. The tire of claim 1 wherein said sidewall rubber composition is exclusive of elastomers having a Tg in a range of about −70° C. and −100° C.

5. The tire of claim 2 wherein said sidewall rubber composition is exclusive of elastomers having a Tg in a range of about −70° C. and −100° C.

6. The tire of claim 3 wherein said sidewall rubber composition is exclusive of elastomers having a Tg in a range of about −70° C. and −100° C.

7. The tire of claim 1 wherein said sidewall rubber composition contains about 5 to about 15 phr of at least one additional elastomer selected from at least one of isoprene/butadiene copolymer rubber, synthetic cis 1,4-polyisoprene rubber and emulsion polymerization prepared styrene/butadiene copolymer rubber.

8. The tire of claim 2 wherein said sidewall rubber composition contains about 5 to about 15 phr of at least one additional elastomer selected from at least one of isoprene/butadiene copolymer rubber, synthetic cis 1,4-polyisoprene rubber and emulsion polymerization prepared styrene/butadiene copolymer rubber.

9. The tire of claim 3 wherein said sidewall rubber composition contains about 5 to about 15 phr of at least one additional elastomer selected from at least one of isoprene/butadiene copolymer rubber, synthetic cis 1,4-polyisoprene rubber and emulsion polymerization prepared styrene/butadiene copolymer rubber.

10. The tire of claim 1 wherein, for said sidewall composition, said coupling agent is a bis-(3-trialkoxysilylalkyl) polysulfide which contains from 2 to 8, with an average of about 3.5 to about 4.5, sulfur atoms in its polysulfidic bridge.

11. The tire of claim 3 wherein, for said sidewall composition, said coupling agent is a bis-(3-trialkoxysilylalkyl) polysulfide which contains from 2 to 8, with an average of about 3.5 to about 4.5, sulfur atoms in its polysulfidic bridge.

12. The tire of claim 1 wherein, for said sidewall composition, said coupling agent is a bis-(3-triethoxysilylpropyl) tetrasulfide material.

13. The tire of claim 1 wherein, for said sidewall composition, said coupling agent is a bis-(3-trialkoxysilylalkyl) polysulfide which contains from 2 to 8, with an average of about 2 to about 2.6, sulfur atoms in its polysulfidic bridge.

14. The tire of claim 1 wherein, for said sidewall composition, said coupling agent is a bis-(3-triethoxysilylpropyl) polysulfide material with an average of from 2 to 2.6 sulfur atoms in its polysulfidic bridge.

15. The tire of claim 1 wherein, for said sidewall composition, said carbon black is selected from at least one of N550, N660 and N326 carbon blacks.

16. The tire of claim 1 wherein, for said circumferential tread composition, said carbon black is selected from at least one of N110, N121, N134, N205, N234 and N299.

* * * * *